US005613790A

United States Patent [19]

Miazga

[11] Patent Number: 5,613,790

[45] Date of Patent: Mar. 25, 1997

[54] APPARATUS FOR NORMALIZING TOP-OF-FORM REGISTRATION IN A MOVING WEB PRINTER

[75] Inventor: Jay M. Miazga, Marysville, Wash.

[73] Assignee: Intermec Corporation, Everett, Wash.

[21] Appl. No.: 522,030

[22] Filed: Aug. 31, 1995

[51] Int. Cl.$^{6}$ .......... G01N 21/86

[52] U.S. Cl. .......... 400/708; 400/56; 250/559.27

[58] Field of Search .......... 400/56, 703, 708, 400/708.1, 711; 250/559.01, 559.04, 559.1, 559.11, 559.19, 559.2, 559.26, 559.27; 356/381, 382

[56] References Cited

U.S. PATENT DOCUMENTS

| | | | |
|---|---|---|---|
| 5,204,537 | 4/1993 | Bennet et al. | 400/56 |
| 5,210,593 | 5/1993 | Kramer | 356/381 |
| 5,486,063 | 1/1996 | Fox et al. | 400/708 |

*Primary Examiner*—Ren Yan

[57] ABSTRACT

In a label printer printing on individual labels carried in spaced relationship on a surface of a longitudinally moving backing strip, this invention discloses apparatus for adjustably sensing leading edge positions of the labels. A stationary member is carried above the backing strip on one side of the backing strip. A movable member is carried by the stationary member for longitudinal movement along the path of the backing strip. There is provision for adjusting the longitudinal position of the moving member. A sensor is carried by the movable member for sensing leading edge positions of individual labels as a function of a change of thickness between the backing strip alone and the backing strip with a label on the surface. Both optical and mechanical versions are disclosed.

18 Claims, 3 Drawing Sheets

APPARATUS FOR NORMALIZING TOP-OF-FORM REGISTRATION IN A MOVING WEB PRINTER

BACKGROUND OF THE INVENTION

1. Technical Field

This invention relates to printers for printing on a moving web and, more particularly, in a label printer printing on individual labels carried in spaced relationship on a surface of a longitudinally moving backing strip, to apparatus for adjustably sensing leading edge positions of the labels comprising, a stationary member carried above the backing strip on one side of the backing strip; a movable member carried by the stationary member for longitudinal movement along the path of the backing strip; adjusting means for adjusting a longitudinal position of the moving member; and, sensor means carried by the movable member for sensing leading edge positions of individual labels as a function of a change of thickness between the backing strip alone and the backing strip with a label on the surface thereof.

2. Background Art

In a label printer such as that generally indicated as 10 in FIG. 1, a plurality of labels 12 are releasably attached to a backing strip 14 forming a strip of media 15 that extends from a supply roll 16 over a plurality of guide rollers 18 to a printhead 20. At the printhead 20, ink from a ribbon 22 extending between a supply roll 24 and a take-up roll 26 is transferred to the labels 12. After printing, the labels 12 are separated from the backing strip 14 by a separator 27 and the backing strip 14 is wound onto a take-up roll 28 for later disposal. The labels 12 and backing strip 14 are moved in combination from the supply roll 16 to the printhead 20 by a driven platen roller 30 which also supports the labels 12 and backing strip 14 under the printhead 20 during the printing process. To keep the cost of the printer 10 low, the take-up roll 26, the take-up roll 28, and the platen roller 30 are all driven directly or indirectly by a single stepping motor 32 as indicated by the dashed lines. The movement of the stepping motor 32 is under the control of logic 34.

In label printing as in many areas, simplicity and cost are major factors. Consumers want the print quality they require in the least expensive printer. This is particularly true in on-demand label printers. And, the introduction of small, narrow labels such as employed as labels for printed circuit boards printed in the "picket fence" mode have made the problem even more severe. Accurate linear placement of the printing on these small labels is critical—particularly if there is any pre-printed material on them. And, at the same time, the cost of the printer is to remain low. Usually, such factors are a trade-off. That is, accurate placement can be obtained in a highly-complicated, high-cost printer. The prior art does not provide a way of obtaining both.

The problem is best understood with primary reference to FIG. 2 in combination with FIG. 1. A sensor 33 is positioned to sense the leading edge 34 of the label 12 next in line to move under the printhead 20. The sensor 33 senses the leading edge 34 at position 37 as indicated by the dashed line so labeled. The printhead 20 prints on the label 12 at the dashed line labeled 39. Thus, the dashed line 39 is the linear registration point for printing on the labels 12. What is needed, therefore, is a way of accurately positioning the labels one-by-one in sequence properly registered at the linear registration point represented by the line 39. In a copending application entitled METHODS AND APPARATUS FOR COMPENSATING STEP DISTANCE IN A STEPPING MOTOR DRIVEN LABEL PRINTER by Jay Miazga et al., Ser. No. 08/522,738, filed Aug. 31, 1995 and assigned to the common assignee of this application, the teachings of which are incorporated herein by reference, the usual technique for accomplishing such linear positioning is described in detail along with improvements which allow for dynamic adjustability of the process. Basically, the platen roller 30 as the primary moving force on the media 15 is driven by a stepping motor (not shown). Based on the labels 12 being equally spaced on the backing strip 14, the logic driving the stepping motor "knows" how many steps, "N", it takes to move the leading edge 34 from the sensing point 37 to the registration point 39. Thus, once the sensor 33 senses the leading edge 34 and outputs a signal on line 35 to the logic, the logic need only step the stepping motor N steps and the leading edge 34 should be properly positioned with respect to the registration point.

In a series of high-cost, low-tolerance printers, the distance between positions 37 and 39 could be held to close tolerances so that in any one of the printers, that distance would be N steps. As stated earlier, however, the demand in the industry among users is for label printers and the like which have both low cost and high performance capability. Low cost of manufacture on a large scale of necessity requires that tolerances be kept lower than possible in short-run, specialty items wherein the buyers are willing to pay the higher costs required. As a consequence, the distance between positions 37 and 39 will vary from printer to printer such that if the printing logic assumes N steps in each case, some printers will be in registration and some won't.

In addition, in another co-pending application entitled METHOD AND APPARATUS FOR ADJUSTING LATERAL IMAGE REGISTRATION IN A MOVING WEB PRINTER by the inventor herein, Ser. No. 08/522,033, filed Aug. 31, 1995 and assigned to the common assignee of this application, the teachings of which are incorporated herein by reference, a sensor is employed in one embodiment for sensing side edges of the media 15 for lateral positional adjusting.

Wherefore, it is an object of the present invention to provide methods and apparatus for making a low-cost web printer in which the linear positioning of labels and the like under the printhead is repeatable from printer to printer.

It is another object of the present invention to provide methods and apparatus for making a low-cost label printer in which the linear positioning of labels under the printhead is repeatable from printer to printer without regard to differences in path length caused by printer production tolerances.

It is still another object of the present invention to provide a sensor which is adjustable with respect to a linear sensing position.

It is yet another object of the present invention to provide a sensor which is adjustable with respect to both a linear sensing position and a lateral sensing position.

Other objects and benefits of this invention will become apparent from the description which follows hereinafter when read in conjunction with the drawing figures which accompany it.

SUMMARY

The foregoing objects have been achieved by the apparatus of the present invention for adjustably sensing top-of-form edge positions of individual items carried in spaced relationship on a surface of a longitudinally moving web comprising, a stationary member carried above the web on one side of the web; a movable member carried by the stationary member for longitudinal movement along the path of the web; adjusting apparatus for adjusting a longitudinal position of the moving member; and, a sensor carried by the movable member for sensing top-of-form positions of individual items as a function of a change of thickness between the web alone and the web with an item on the surface thereof.

In the preferred embodiment, the adjusting apparatus comprises, a shaft rotatably passing longitudinally through the stationary member with respect to movement of the web, the shaft being locked against longitudinal movement and having a threaded end; and, the movable member carrying a threaded bore threadedly engaged with the threaded end whereby when the shaft is rotated the movable member is moved longitudinally along the threaded end. The preferred moveable member is U-shaped with the stationary member disposed within the U shape of the moveable member and the shaft passes through the moveable member in two places on opposite sides of the U shape.

In an optical embodiment, the sensor comprises a photodetector for sensing changes in light level which occur at the top-of-form positions and outputting an electrical signal in response thereto and there is a source of light positioned to direct light towards the sensor on an opposite side of the web from the one side. For sensing both linear and lateral positions, the source of light comprises an array of light emitters which floods an area of the web above the sensor with light and there is sideward adjustability of the photodetector.

In a mechanical embodiment, the sensor comprises a mechanical sensor having a member which contacts the surface of the web carrying the items and outputs a signal when changes in thickness which occur at the top-of-form positions are sensed.

DESCRIPTION OF THE PREFERRED EMBODIMENT

Figure 1:
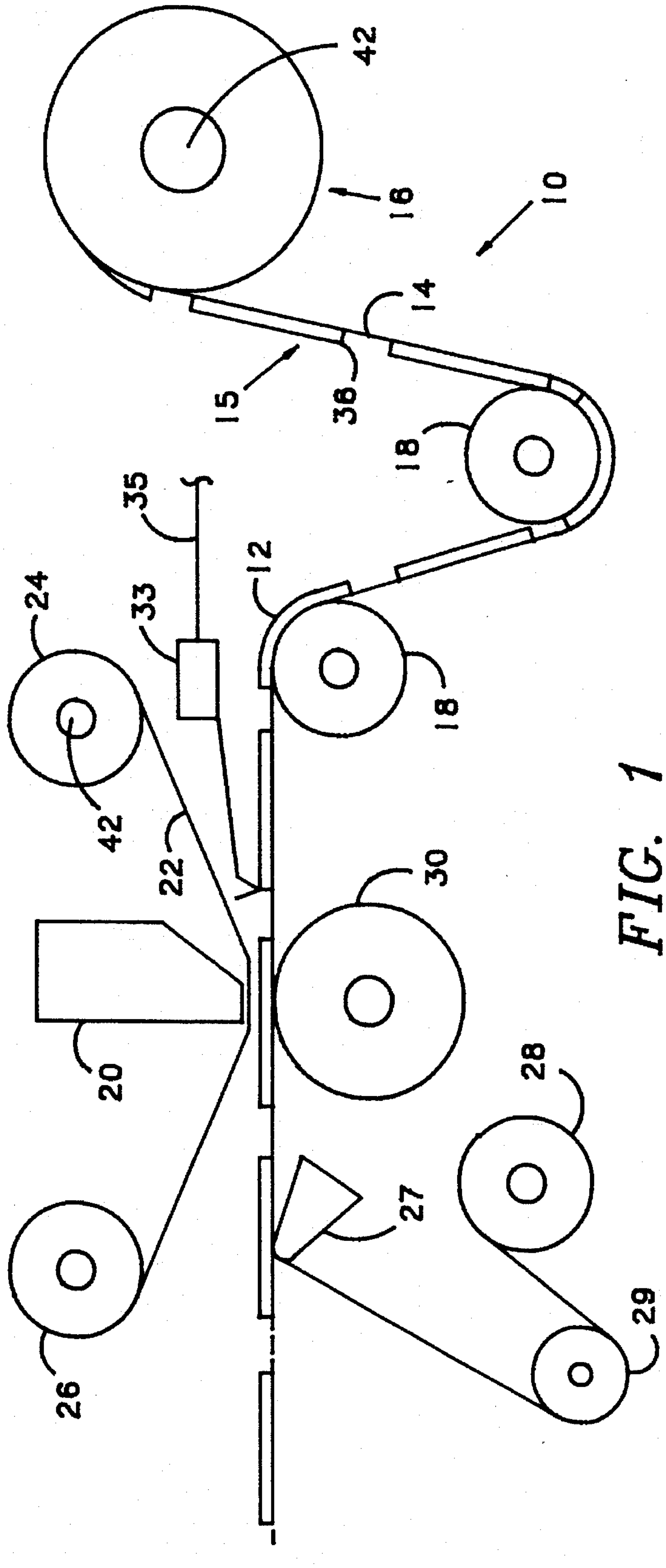
FIG. 1 is a simplified side view of a printer for printing on a moving web as wherein the present invention is employed.
Figure 2:
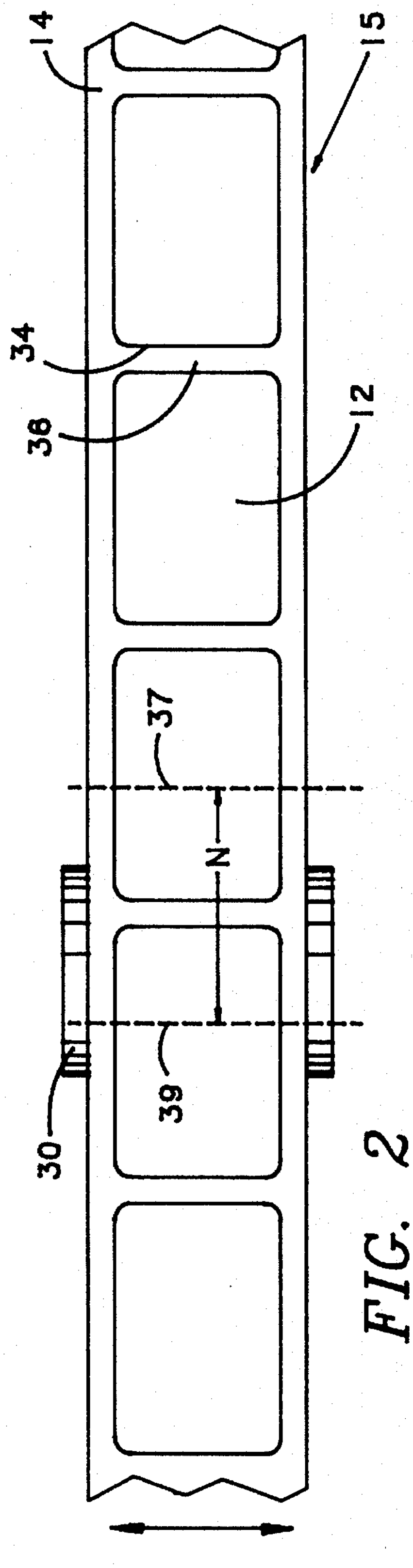
FIG. 2 is a simplified top view of a portion of the printer of FIG. 1 showing the problem of linear registration solved by the present invention.
Figures 3, 4, 5:
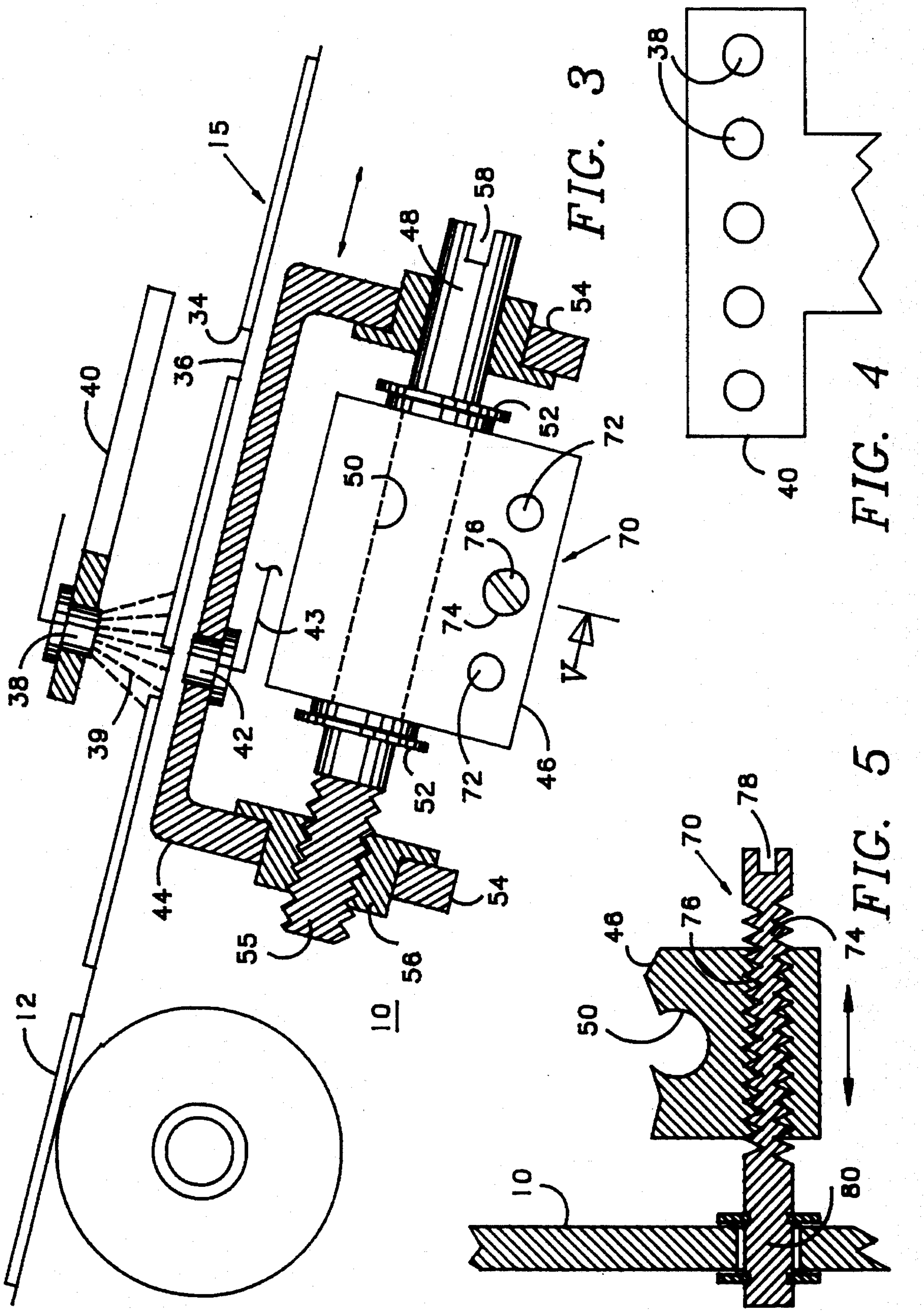
FIG. 3 is a detailed side view of linear position sensing apparatus employing an optical approach according to the present invention. A provision for adding lateral position sensing is also shown.
FIG. 4 is a plan view of the light emitting array employed in the apparatus of FIG. 3.
FIG. 5 is a cutaway side view of a portion of the apparatus of FIG. 3 at the cut line V.

The present invention is shown in detail in a first and preferred embodiment in FIG. 3. The most usual linear reference point employed when printing on spaced labels 12 is the leading edge 34 of the label 12 which follows the gap 36 between consecutive labels 12. In the optical approach of FIG. 3, the leading edge 34 is sensed by the change in light transmissivity of the media 15 which takes place. An array of light emitters 38 is carried by a stationary member 40 on one side of the media 15. A light detector 42 is carried by a linearly adjustable member 44 on the opposite side of the media 15. The light detector 42 outputs an electrical signal on line 43 as a result of the change in light transmission which takes place at the leading edge 34 of each label 12. For size, power, and cost reasons, light emitting diodes are preferred for the light emitters 38 and a photodiode is preferred for the light detector 42. An array of light emitters 38, as depicted in FIG. 4, is employed to flood the general area of adjustability with light 39. This is as opposed to the usual optical sensing arrangement wherein one light emitter is positioned opposite one detector and position sensing occurs when the light beam between them is broken. With the array, the light source can be fixed and is simplified. With a single beam of light, the light source would have to be connected to and move with the member 44. This approach could, of course, be employed if desired while still being within the scope and spirit of the present invention. A further reason for the array in the preferred embodiment will be described in detail shortly.

While other arrangements could be employed within the scope and spirit of the present invention, the arrangement of FIG. 3 is preferred. As with the member 40, there is a stationary mounting block 46 carried by the printer 10. A shaft 48 is rotationally mounted through longitudinal bore 50 in the block 46. The shaft 48 is held longitudinally between two E-rings 52. The member 44 has a pair of ears 54 on opposite ends of the block 46 through which the shaft 48 passes. One end 55 of the shaft 48 is threaded and the ear 54 through which it passes is threaded as with the threaded insert 56 into which the threaded end 55 of the shaft 48 is threadedly engaged. The other end of the shaft 48 is slotted at 58 for a screwdriver as shown or could be provided with a knob for gripping. Thus, by rotating the shaft 48 the linear position of the detector 42 can be adjusted to compensate for differences between the linear path length from printer to printer of like kind.

The optical version of FIG. 3 is also preferred because it can easily be employed for both linear position sensing as described above and for lateral position sensing as required in the apparatus of the above-referenced co-pending application by the inventor herein. In this case, the block 46 is adjustably attached to the printer 10 by a lateral position adjusting mechanism 70. The block 46 is slidably mounted on a pair of lateral rods 72. A lateral threaded bore 74 through the block 46 has a threaded rod 76 therethrough. The outer end 78 of the threaded rod 76 is slotted for a screwdriver. A knob could, of course, be employed if desired and space allowed. The opposite end 80 of the threaded rod 76 is rotationally captured by the printer 10. Thus, as the threaded rod 76 is rotated, the block 46 is laterally repositioned by the threaded bore 74 moving along the threaded rod 76. As can now be recognized and appreciated, the array 40 provides light across the full width of operability with respect to lateral positioning.

Figure 6:
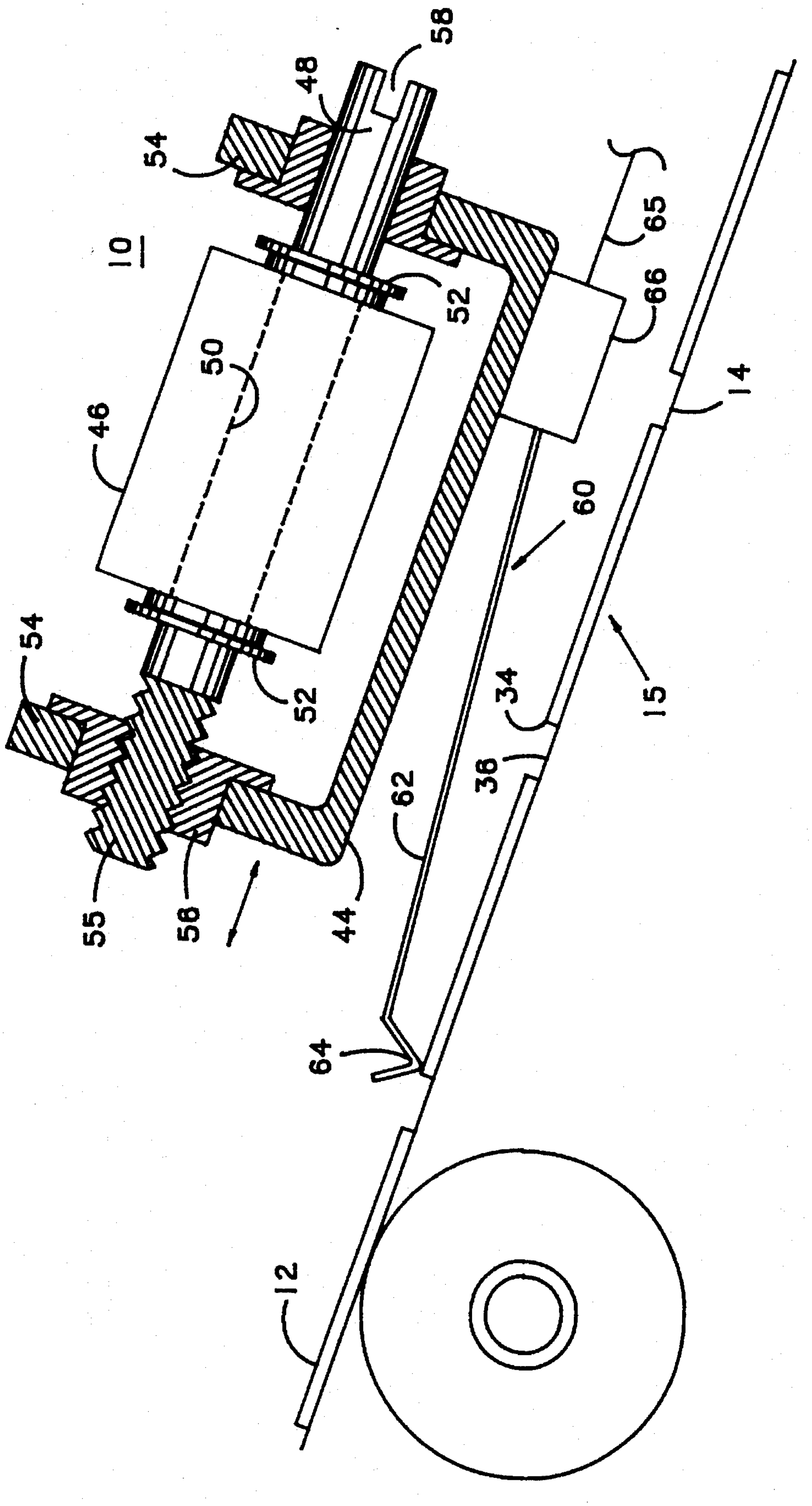
FIG. 6 is a detailed side view of linear position sensing apparatus employing a mechanical approach according to the present invention.

A mechanical version of the present invention is shown in FIG. 6. Unlike the prior embodiment in which the elements could be on either side of the media 15, in this embodiment the mechanical element must be above the labels 12 to physically sense the change in thickness of the leading edge 34 which follows the gap 36. As will be recognized by those of ordinary skill in the art, the adjusting mechanism of this embodiment is the same as in the prior embodiment. In this case, however, the linearly adjustable member 44 carries the mechanical sensing assembly 60. The assembly 60 comprises a movable spring-biased arm 62 with an end 64 which rides along the media 15. When a change in thickness moves the end 64 and bends the arm 62, the sensing apparatus 66 sends an electrical signal on line 65. The sensing apparatus 66 can be any one of several known in the art and, per se, forms no part of the present invention. The same is true for the arm 62. It is the linear adjustability of the mounting which is the subject of this invention.

As should be recognized and appreciated by those of ordinary skill in the art from the foregoing description, the apparatus of the present invention in either its optical or mechanical implementation provides an easy way in which to adjust similar label printers, or other like devices, for minor differences in path length which occur in the manufacturing process. To calibrate a new printer or after working in the relevant area in a manner which could effect its linear calibration, a test media is run through the printer using the expected value N steps to move the labels from the sensor to the printhead. The shaft 48 is then rotated in the appropriate direction to move the member 44 until the desired linear registration point is achieved. The procedure is accomplished dynamically and the adjustment can be made by simply viewing the labels being output by the printer as the linear adjustment to the apparatus of the present invention is made.

A similar approach to calibration would be employed if the bi-directional embodiment is employed in an automated version of the above-referenced co-pending application regarding lateral positioning. With a test media running through the printer, the lateral adjusting apparatus 70 would be employed to position the photodetector 42 at the side edge to be sensed.

Wherefore, having thus described the preferred embodiment, what is claimed is:

1. Apparatus for adjustably sensing top-of-form edge positions of individual items carried in space relationship on a surface of a longitudinally moving web comprising:

a) a stationary member carried above the web on one side the web;

b) a movable member carried by said stationary member for longitudinal movement along the path of the web;

c) adjusting apparatus for adjusting a longitudinal position of said movable member; and, d) a sensor carried by said movable member for sensing top-of-form positions of individual items as a function of a change of thickness between the web alone and the web with an item on the surface thereof.

2. The apparatus of claim 1 wherein said adjusting apparatus comprises:

a) a shaft rotatably passing longitudinally through said stationary member with respect to movement of the web, said shaft being locked against longitudinal movement and having a threaded end; and, b) said movable member carrying a threaded bore threadedly engaged with said threaded end whereby when said shaft is rotated said movable member is moved longitudinally along said threaded end.

3. The apparatus of claim 1 wherein:

a) said moveable member is U-shaped with said stationary member disposed within the U shape of said moveable member; and, b) said shaft passes through said moveable member in two places on opposite sides of the U shape.

4. The apparatus of claim 1 wherein:

a) said sensor comprises a photodetector for sensing changes in light level which occur at said top-of-form positions and outputting an electrical signal in response thereto; and additionally comprising, b) a source of light positioned to direct light towards said sensor on an opposite side of the web from said one side.

5. The apparatus of claim 4 wherein:

a) said source of light comprises an array of light emitters which floods an area of the web above said sensor with light; and additionally comprising, b) apparatus for laterally adjusting the position of said photodetector whereby said photodetector can detect both longitudinal and lateral edges.

6. The apparatus of claim 1 wherein:

said sensor comprises a mechanical sensor having a member which contacts the surface of the web carrying the items and outputs a signal when changes in thickness which occur at said top-of-form positions are sensed.

7. Apparatus for adjustably sensing leading edge positions of individual labels carried in space relationship on a surface of a longitudinally moving backing strip comprising:

a) a stationary member carried above the backing strip on one side the backing strip;

b) a movable member carried by said stationary member for longitudinal movement along the path of the backing strip;

c) adjusting apparatus for adjusting a longitudinal position of said movable member; and, d) a sensor carried by said movable member for sensing leading edge positions of individual labels as a function of a change of thickness between the backing strip alone and the backing strip with an item on the surface thereof.

8. The apparatus of claim 7 wherein said adjusting apparatus comprises:

a) a shaft rotatably passing longitudinally through said stationary member with respect to movement of the backing strip, said shaft being locked against longitudinal movement and having a threaded end; and, b) said movable member carrying a threaded bore threadedly engaged with said threaded end whereby when said shaft is rotated said movable member is moved longitudinally along said threaded end.

9. The apparatus of claim 7 wherein:

a) said moveable member is U-shaped with said stationary member disposed within the U shape of said moveable member; and, b) said shaft passes through said moveable member in two places on opposite sides of the U shape.

10. The apparatus of claim 7 wherein:

a) said sensor comprises a photodetector for sensing changes in light level which occur at the leading positions and outputting an electrical signal in response thereto; and additionally comprising, b) a source of light positioned to direct light towards said sensor on an opposite side of the backing strip from said one side.

11. The apparatus of claim 10 wherein:

a) said source of light comprises an array of light emitters which floods an area of the backing strip above said sensor with light; and additionally comprising, b) apparatus for laterally adjusting the position of said photodetector whereby said photodetector can detect both longitudinal and lateral edges.

12. The apparatus of claim 7 wherein:

said sensor comprises a mechanical sensor having a member which contacts the surface of the backing strip carrying the labels and outputs a signal when changes in thickness which occur at the leading edges are sensed.

13. In a label printer printing on individual labels carried in spaced relationship longitudinally on a surface of a moving backing strip, apparatus for adjustably sensing leading edge positions of the labels comprising:

a) a stationary member carried above the backing strip on one side the backing strip;

b) a movable member carried by said stationary member for longitudinal movement along the path of the backing strip;

c) adjusting means for adjusting a longitudinal position of said movable member; and, d) sensor means carried by said movable member for sensing leading edge positions of individual labels as a function of a change of thickness between the backing strip alone and the backing strip with an item on the surface thereof.

14. The apparatus of claim 13 wherein:

said sensor means comprises means for sensing leading edge positions of individual labels as a function of changes in light transmissivity taking place between the backing strip alone and the backing strip with a label on the surface thereof.

15. The apparatus of claim 14 and additionally comprising:

said sensor means including means for sensing side edge positions of the media as a function of changes in light transmissivity at side edges thereof.

16. The apparatus of claim 13 wherein:

said sensor means comprises means for mechanically sensing leading edge positions of individual labels as a function of changes in thickness taking place at junctions between the backing strip alone followed by the backing strip with a label on the surface thereof.

17. Optical sensing apparatus for adjustably sensing changes in light transmissivity of a moving web at a point along a longitudinal path thereof comprising:

a) a stationary member carried above the point on one side the web;

b) a movable member carried by said stationary member for longitudinal movement along the path;

c) adjusting apparatus for adjusting a longitudinal position of said movable member; and, d) a photodetector carried by said movable member with a light sensing portion thereof directed towards the web; and, e) a light emitter carried above the point on a side of the web opposite said one side of the web and directing light toward said photodetector.

18. The optical sensing apparatus of claim 17 wherein:

said light emitter comprises an array of light emitters flooding an area of the web around the point with light, a) said light emitter comprises an array of light emitters flooding an area of the web around the point with light; and additionally comprising, b) apparatus for laterally adjusting the position of said photodetector whereby said photodetector can detect both longitudinal and lateral edges.

* * * * *